(12) United States Patent
Elie et al.

(10) Patent No.: US 10,857,870 B2
(45) Date of Patent: Dec. 8, 2020

(54) HYBRID VEHICLE

(71) Applicant: FORD GLOBAL TECHNOLOGIES, LLC, Dearborn, MI (US)

(72) Inventors: Larry Dean Elie, Ypsilanti, MI (US); Allan Roy Gale, Livonia, MI (US); David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/216,540

(22) Filed: Dec. 11, 2018

(65) Prior Publication Data

US 2020/0180420 A1    Jun. 11, 2020

(51) Int. Cl.
*B60K 6/26* (2007.10)
*H02K 7/00* (2006.01)
*B60L 50/61* (2019.01)

(52) U.S. Cl.
CPC .............. *B60K 6/26* (2013.01); *B60L 50/61* (2019.02); *H02K 7/006* (2013.01)

(58) Field of Classification Search
CPC ............ B60K 6/26; H02K 7/006; B60L 50/61
See application file for complete search history.

(56) References Cited

U.S. PATENT DOCUMENTS

| | | | | |
|---|---|---|---|---|
| 5,789,877 A | * | 8/1998 | Yamada | B60K 6/26 318/9 |
| 5,804,934 A | * | 9/1998 | Yamada | B60K 6/26 318/77 |
| 5,873,801 A | * | 2/1999 | Taga | B60K 6/26 477/5 |
| 5,903,112 A | * | 5/1999 | Yamada | B60K 6/26 318/10 |
| 5,903,113 A | * | 5/1999 | Yamada | B60K 6/26 318/10 |
| 5,905,346 A | * | 5/1999 | Yamada | B60K 6/26 318/50 |
| 5,909,094 A | * | 6/1999 | Yamada | B60K 6/26 318/140 |
| 5,909,720 A | * | 6/1999 | Yamaoka | B60L 15/007 123/179.3 |
| 5,914,575 A | * | 6/1999 | Sasaki | B60L 50/61 318/150 |
| 5,920,160 A | * | 7/1999 | Yamada | B60K 6/26 318/9 |
| 5,998,901 A | | 12/1999 | Kawabata et al. | |
| 6,474,428 B1 | * | 11/2002 | Fujikawa | B60K 6/365 180/65.25 |
| 6,492,742 B1 | * | 12/2002 | Fujikawa | B60K 6/26 290/40 C |
| 6,520,879 B2 | | 2/2003 | Kawabata et al. | |

(Continued)

*Primary Examiner* — Jacob B Meyer
(74) *Attorney, Agent, or Firm* — David B. Kelley; Brooks Kushman P.C.

(57) ABSTRACT

A vehicle includes an electric machine, an engine, and stator. The electric machine has a magnetic armature and an electromagnetic armature. The electromagnetic armature is secured to a wheel and has an electrical circuit that includes primary and secondary coils. The engine is configured to rotate the magnetic armature to induce current in the circuit via the primary coils. The stator has tertiary coils that are configured to transfer power to the electromagnetic armature via the secondary coils to drive the wheel.

17 Claims, 3 Drawing Sheets

(56) References Cited

U.S. PATENT DOCUMENTS

| | | | | |
|---|---|---|---|---|
| 7,172,525 | B2* | 2/2007 | Sowul | B60K 6/365 475/5 |
| 7,753,822 | B2* | 7/2010 | Weinschenker | F16H 57/0434 180/65.285 |
| 8,047,321 | B2 | 11/2011 | Martini et al. | |
| 8,087,483 | B2* | 1/2012 | Bucknor | B60K 6/36 180/65.245 |
| 8,182,391 | B2* | 5/2012 | Klemen | B60K 6/383 477/5 |
| 8,298,105 | B2* | 10/2012 | Kajigai | B60K 6/365 475/35 |
| 8,454,466 | B2* | 6/2013 | Samie | B60K 6/383 475/8 |
| 8,562,480 | B1* | 10/2013 | Mellet | F16H 3/725 475/317 |
| 8,622,870 | B2* | 1/2014 | Kawasaki | B60K 6/365 477/3 |
| 8,639,423 | B2* | 1/2014 | Schaaf | B60K 6/365 701/51 |
| 8,892,290 | B2* | 11/2014 | Reed | B60L 15/2081 701/22 |
| 9,039,570 | B2* | 5/2015 | Doering | B60W 30/20 477/86 |
| 9,156,469 | B2* | 10/2015 | Gibson | B60W 20/40 |
| 9,322,380 | B2* | 4/2016 | Doering | F02D 41/023 |
| 9,393,954 | B2* | 7/2016 | Gibson | B60K 6/26 |
| 10,457,266 | B2* | 10/2019 | Kodama | F16H 61/684 |
| 10,457,275 | B2* | 10/2019 | Trent | B60K 6/48 |
| 10,518,626 | B2* | 12/2019 | Pettersson | B60K 6/383 |
| 2002/0086755 | A1* | 7/2002 | Hamai | F16D 27/115 475/5 |
| 2008/0176697 | A1* | 7/2008 | Raghavan | F16H 3/728 475/5 |
| 2008/0236917 | A1* | 10/2008 | Abe | B60K 6/365 180/65.235 |
| 2009/0294190 | A1 | 12/2009 | Oldenburg et al. | |
| 2011/0034282 | A1* | 2/2011 | Akutsu | B60K 6/26 475/5 |
| 2011/0092328 | A1* | 4/2011 | Tiwari | B60K 6/365 475/5 |
| 2011/0111910 | A1* | 5/2011 | Ideshio | B60W 10/113 475/5 |
| 2011/0220428 | A1* | 9/2011 | Ando | B60K 6/365 180/65.245 |
| 2012/0103749 | A1* | 5/2012 | Kimura | B60W 10/08 192/54.1 |
| 2012/0122629 | A1* | 5/2012 | Akutsu | B60L 3/0061 477/3 |
| 2012/0149518 | A1* | 6/2012 | Kimes | B60L 50/16 475/5 |
| 2012/0197475 | A1* | 8/2012 | Akutsu | B60W 10/08 701/22 |
| 2012/0203414 | A1* | 8/2012 | Akutsu | H02K 16/00 701/22 |
| 2013/0035188 | A1* | 2/2013 | Yagasaki | B60K 6/365 475/5 |
| 2013/0109530 | A1* | 5/2013 | Kaltenbach | B60K 6/387 477/5 |
| 2013/0113308 | A1* | 5/2013 | Dogel | F16F 15/1478 310/51 |
| 2014/0297085 | A1* | 10/2014 | Hayashi | B60L 58/21 701/22 |
| 2015/0266469 | A1* | 9/2015 | Gibson | B60W 10/08 701/22 |
| 2015/0343890 | A1* | 12/2015 | Ortmann | B60W 20/40 477/5 |
| 2016/0025207 | A1* | 1/2016 | Miyamoto | F16H 61/0028 701/68 |
| 2016/0096522 | A1* | 4/2016 | Ortmann | B60K 6/383 477/5 |
| 2016/0207525 | A1* | 7/2016 | Nefcy | B60W 10/08 |
| 2017/0093246 | A1* | 3/2017 | Moore | B60K 6/20 |
| 2017/0136867 | A1* | 5/2017 | Holmes | F16H 3/725 |
| 2017/0166194 | A1* | 6/2017 | Kumazaki | B60W 10/08 |
| 2017/0291599 | A1* | 10/2017 | Pietron | B60W 10/026 |
| 2018/0319266 | A1* | 11/2018 | Kaltenbach | B60K 6/48 |
| 2019/0009770 | A1* | 1/2019 | Kodama | F16H 61/684 |
| 2019/0027993 | A1* | 1/2019 | Salter | H02K 1/17 |
| 2019/0176806 | A1* | 6/2019 | Trent | B60K 6/48 |
| 2019/0305644 | A1* | 10/2019 | Ideue | H02K 9/19 |
| 2019/0344655 | A1* | 11/2019 | Pettersson | B60W 10/02 |
| 2020/0180420 | A1* | 6/2020 | Elie | B60K 6/26 |

* cited by examiner

HYBRID VEHICLE

TECHNICAL FIELD

The present disclosure relates to hybrid vehicles that include multiple power sources such as internal combustions engines and electric machines.

BACKGROUND

The present disclosure relates to hybrid/electric vehicles.

SUMMARY

A vehicle includes an electric machine, an engine, and a stator. The electric machine has a magnetic armature and an electromagnetic armature. The electromagnetic armature is secured to a wheel and has an electrical circuit that includes primary and secondary coils. The engine is configured to rotate the magnetic armature to induce current in the circuit via the primary coils. The stator has tertiary coils that are configured to transfer power to the electromagnetic armature via the secondary coils to drive the wheel.

A vehicle includes an armature, an engine, and a stator. The armature is secured to a drive wheel and has an electrical circuit that includes primary and secondary coils. The engine is configured to rotate a magnet to induce current in the circuit via the primary coils. The stator has tertiary coils that are configured to interact with the secondary coils to transfer power between a battery and the armature to rotate the drive wheel or charge the battery.

A vehicle includes an electromagnetic armature, an engine, and a stator. The electromagnetic armature has an electrical circuit that includes primary and secondary coils. The engine has a crankshaft that is configured to rotate a magnetic armature to induce current in the circuit via the primary coils. The stator has tertiary coils that are configured to transfer power to the secondary coils to rotate the electromagnetic armature.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
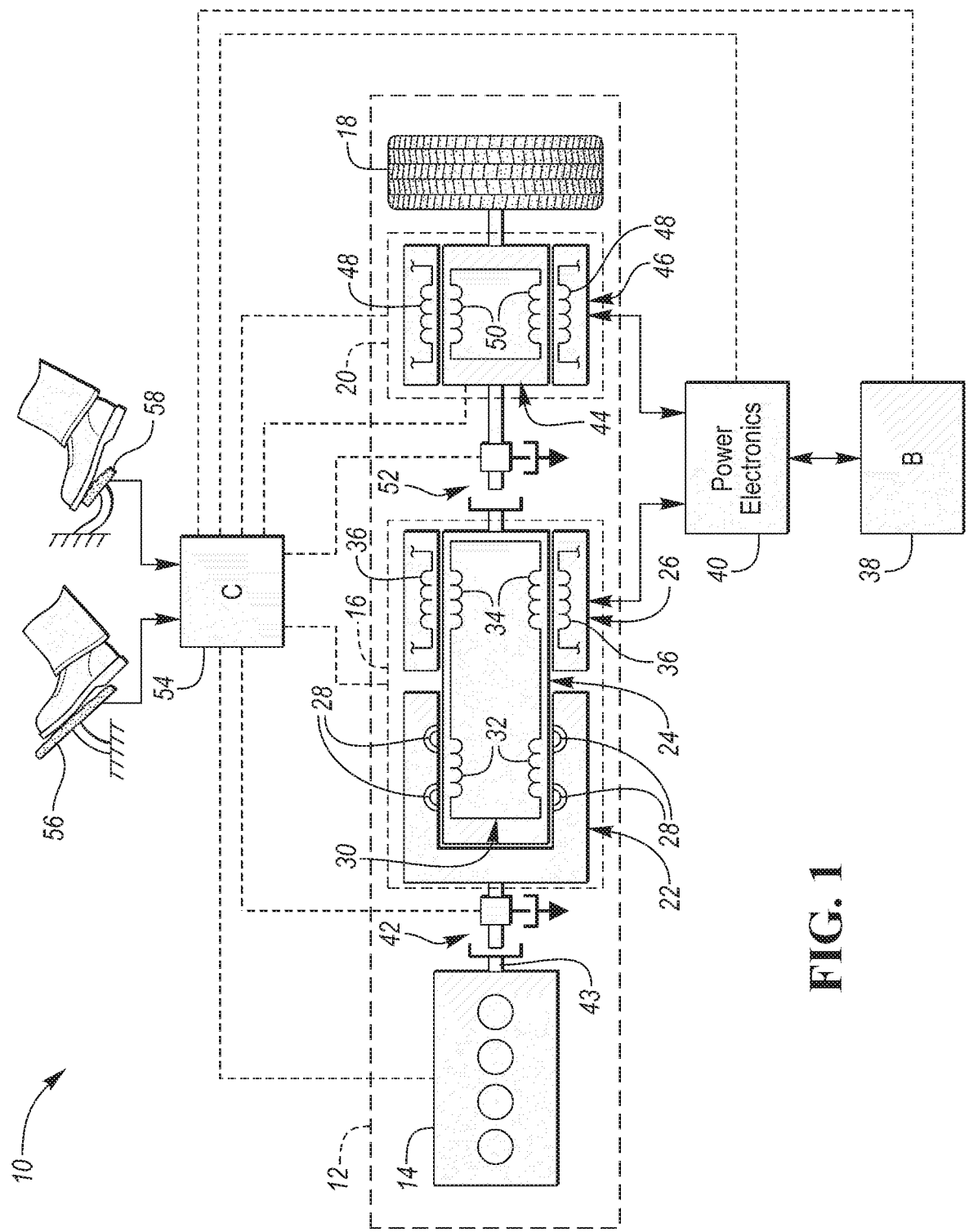
FIG. 1 is a schematic illustration of a first embodiment of a powertrain of a hybrid electric vehicle.

Referring to FIG. 1, a schematic diagram of a first embodiment of a hybrid electric vehicle (HEV) 10 is illustrated. FIG. 1 illustrates representative relationships among the components. Physical placement and orientation of the components within the vehicle may vary. The HEV 10 includes a powertrain 12. The powertrain 12 includes an engine 14, an primary electric machine 16, and a drive wheel 18. The HEV 10 may also include a secondary electric machine 20. However, it should be understood that some embodiments may include the secondary electric machine 20 while other embodiments may exclude the secondary electric machine 20.

The primary electric machine 16 includes a magnetic rotor or magnetic armature 22, an electromagnetic rotor or electromagnetic armature 24, and a primary stator 26. The magnetic armature 22 includes one or more of permanent magnets 28. The electromagnetic armature 24 has an electrical circuit 30 that includes primary coils 32 and secondary coils 34. In the first embodiment, the magnetic armature 22 has the shape of a rotating drum that is disposed over the electromagnetic armature 24 such that the one or more permanent magnets 28 are adjacent to and configured to interact with the primary coils 32. The engine 14 is configured to rotate the magnetic armature 22 such that there is a speed differential between the magnetic armature 22 and the electromagnetic armature 24 so that magnetic fields of the one or more permanent magnets 28 induce electrical current into the circuit 30 via the primary coils 32. Once the current is induced into the electrical circuit 30 via the primary coils 32, the secondary coils 34 generate a magnetic field. The primary stator 26 includes tertiary coils 36 that are configured to interact with the secondary coils 34 of the electromagnetic armature 24. The tertiary coils 36 generate a magnetic field that interacts with the magnetic field of the secondary coils 34 when there is a speed differential between the electromagnetic armature 24 and the primary stator 26, which results in a transfer of power between the electromagnetic armature 24 and the tertiary coils 36 via the secondary coils 34. The tertiary coils 36 may be energized by an external power source such as a direct current exciter (not shown).

More specifically, power may flow from a battery 38 via the tertiary coils 36 to the secondary coils 34 in order to drive or rotate the electromagnetic armature 24. The power may then be delivered to the drive wheel 18 from the electromagnetic armature 24 to propel the HEV 10. The transfer of power may also flow from the secondary armature 24 to the battery 38 in order to charge the battery 38 via the interaction between the secondary coils 34 and tertiary coils 36. More specifically, power may flow from the secondary coils 34 to the battery 38 when the engine 14 is being utilized to rotate the magnetic armature 22 to generate electrical current within electoral circuit 30 or during periods of regenerative braking when rotational power is flowing from the drive wheel 18 and into the electromagnetic armature 24, which then charges the battery 38 via the interaction between the secondary coils 34 and tertiary coils 36. During periods of regenerative braking where the primary electric machine 16 is being utilized to charge the battery 38, the engine 14 may be disconnected from the remainder of the powertrain 12 by transitioning a first coupler 42 that is disposed between the engine 14 and the magnetic armature 22 from a first position to a second position. More specifically, the first coupler 42 may be configured to couple a crankshaft 43 of the engine 14 to the magnetic armature 22 in the first position and to decouple the crankshaft 43 from the magnetic armature 22 in the second position. The first coupler 42 may also be configured to couple the magnetic armature 22 to a mechanical ground, such as the frame of the vehicle or the engine block, in the second position. The first coupler 42 may be any type of clutch (e.g., dog clutch, disk clutch, selectable one-way clutch, etc.) or any other type of disconnecting device.

Also, during regenerative braking, the magnetic armature 22 may be controlled (e.g., braked or slowed) to ensure there is a speed differential between the electromagnetic armature 24 and the magnetic armature 22. Such a speed differential ensures the magnetic armature 22 is inducing electrical current into the electrical circuit 30 so that the secondary coils 34 generate a magnetic field, which then interact with the tertiary coils 36 to allow power to flow from the electromagnetic armature 24 to the battery 38.

The power that is being input into the battery 38 from the electromagnetic armature 24 of the primary electric machine, via the interaction between the secondary coils 34 and tertiary coils 36, when the engine 14 is rotating the magnetic armature 22 may be represented by equation (1):

$$P_{bat1}=(\omega_{eng}\omega_{elect\_arm})\tau_{eng} \quad (1)$$

where $P_{bat1}$ is the power input from the battery 38 from the electromagnetic armature 24, $\omega_{eng}$ is the rotational speed of the engine, $\omega_{elect\_arm}$ is the rotational speed of the electromagnetic armature 24, and $\tau_{eng}$ is the torque of the engine 14.

Power electronics 40 may be disposed between the battery 38 and the secondary coils 36. The power electronics 40 may include inverting circuitry that converts direct current from the battery 38 into alternating current, which is then delivered to the secondary coils 36 when power is flowing from the battery 38 to the secondary coils 36. The power electronics 40 may also include rectifying circuitry that converts alternating current from the secondary coils 36 into direct current, which is then delivered to the battery 38 when power is flowing from the secondary coils 36 to the battery 38.

In embodiments that do not include the secondary electric machine 20, the electromagnetic armature 24 may be directly secured to the drive wheel 18, such that the power flows directly between the electromagnetic armature 24 and the drive wheel 18. In embodiments that do include the secondary electric machine 20, the secondary electric machine 20 may be disposed between the primary electric machine 16 and the drive wheel 18, and may be configured to add additional torque and power to the drive wheel 18. More specifically, a secondary rotor 44 of the secondary electric machine 20 may be coupled to each of and establish a connection between the electromagnetic armature 24 of the primary electric machine 16 and the drive wheel 18, such that power may flow between the electromagnetic armature 24 and the drive wheel 18 via the secondary rotor 44.

The secondary electric machine 20 includes a secondary stator 46. The secondary stator 46 includes quaternary coils 48 and the secondary rotor 44 may include quinary coils 50. Alternatively, the secondary rotor 44 may include permanent magnets as opposed to the quinary coils 50. The quaternary coils 48 and quinary coils 50 (or permanent magnets) generate magnetic fields that interact with each other when there is a speed differential between the secondary rotor 44 and the secondary stator 46, which results in a transfer of power between the secondary rotor 44 and the secondary stator 46. The quaternary coils 48 and quinary coils 50 (if utilized instead of permanent magnets) may be energized by an external power source such as a direct current exciter (not shown).

More specifically, power may flow from the battery 38 via the quaternary coils 48 to the quinary coils 50 (or permanent magnets) in order to drive or rotate the secondary rotor 44. The power is then delivered to the drive wheel 18 from the secondary rotor 44 to propel the HEV 10, since the secondary rotor 44 is coupled to the drive wheel 18. The transfer of power may also flow from the drive wheel 18, through the secondary rotor 44, and to the battery 38, via the power electronics 40 and the interaction between the quaternary coils 48 to the quinary coils 50 (or permanent magnets), in order to charge the battery 38. More specifically, power may flow from the quinary coils 50 (or permanent magnets) of the secondary rotor 44 to the battery 38 via the quaternary coils 48 of the secondary stator 46 when the engine 14 is being utilized to rotate the magnetic armature 22, which results in rotation of the secondary rotor 44 since it is coupled to the electromagnetic armature 24, or during periods of regenerative braking when rotational power is flowing from the drive wheel 18 and into the secondary rotor 44, which then charges the battery 38 via the interaction between the quinary coils 50 (or permanent magnets) and the quaternary coils 48.

The power that is being output from the battery 38 or input into the battery 38 to or from the secondary electric machine 20, via the interaction between the quaternary coils 48 and the quinary coils 50 (or permanent magnets), may be represented by equation (2):

$$P_{bat2}=\omega_{eng}\tau_{em2} \quad (2)$$

where $P_{bat2}$ is the power input or output from the battery 38 to or from the secondary electric machine 20 and $\tau_{em2}$ is the demanded torque of secondary electric machine 20 that is utilized to either power the drive wheel 18 or to charge the battery 38 depending on the direction of the torque.

The power that is being delivered to the drive wheel 18 may be represented by equation (3):

$$P_{dw}=(\tau_{eng}+\tau_{em2})\omega_{elect\_arm} \quad (3)$$

where $P_{bat2}$ is the total power being delivered to the drive wheel 18, where the rotational speed of the electromagnetic armature $\omega_{elect\_arm}$ has a value that is less than rotational speed of the engine $\omega_{eng}$.

The secondary rotor 44 may be directly coupled to the drive wheel 18 and may be directly coupled to or an integral portion of the electromagnetic armature 24. In such an embodiment where the secondary rotor 44 is directly coupled to or an integral portion of the electromagnetic armature, the engine 14 may be disconnected from the remainder of the powertrain 12 by transitioning the first coupler 42 to the second position, which is desirable during periods of regenerative braking. Alternatively, the secondary rotor 44 may be directly coupled to the drive wheel 18 and selectively coupled to the electromagnetic armature 24 via a second coupler 52. The second coupler 52 may be any type of clutch (e.g., dog clutch, disk clutch, selectable one-way clutch, selectable two-way clutch, etc.) or any other type of disconnecting device. During periods where the primary electric machine 16 is being utilized to power the drive wheel 18 or to recharge the battery 38 via regenerative braking alone or in conjunction with the secondary electric machine 20, the second coupler 52 may be transitioned to from a first position to a second to establish a connection between the electromagnetic armature 24 of the primary electric machine 16 and the drive wheel 18.

When both primary electric machine 16 and the secondary electric machine 20 are transferring power to the drive wheel 18 to propel the HEV 10, the current generated in the tertiary coils 36 of the primary electric machine 16 from the difference in speed between the magnetic armature 22 and electromagnetic armature 24 may be delivered to the quaternary coils 48 of the secondary stator 46 of secondary electric machine 20 through an electrical connection (not shown) between the tertiary coils 36 and the quaternary coils 48 in order to increase the power output of the secondary electric machine 20.

During periods were the secondary electric machine 20 is being utilized to power the drive wheel 18 alone or to recharge the battery 38 alone, the second coupler 52 may be transitioned to the first position to disconnect the engine 14 and the electromagnetic armature 24 of the primary electric machine 16 from the drive wheel 18. Embodiments that include the second coupler 52 may or may not include the first coupler 42.

The powertrain 12 further includes an associated controller 54 such as a powertrain control unit (PCU). While illustrated as one controller, the controller 54 may be part of a larger control system and may be controlled by various other controllers throughout the vehicle 10, such as a vehicle system controller (VSC). It should therefore be understood that the powertrain control unit 54 and one or more other controllers can collectively be referred to as a "controller" that controls various actuators in response to signals from various sensors to control functions such as starting/stopping engine 14, operating the primary electric machine or secondary electric machine 20 to provide power to the drive wheel 18 or to charge the battery 38, transitioning the first coupler 42 or second coupler 52 between the first and second positions, etc. Controller 54 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 54 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 54 may communicate signals to and/or from engine 14, primary electric machine 16, secondary electric machine 20 battery 38, power electronics 40, first coupler 42, and second coupler 52. Although not explicitly illustrated, those of ordinary skill in the art will recognize various functions or components that may be controlled by controller 54 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging, regenerative braking, primary electric machine 16 operation, secondary electric machine 20 operation, apply pressures of the first coupler 42 and second coupler 52, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), deceleration or shift mode (MDE), battery temperature, voltage, current, or state of charge (SOC) for example.

An accelerator pedal 56 is used by the driver of the vehicle to provide a demanded torque, power, or drive command to propel the vehicle. In general, depressing and releasing the accelerator pedal 56 generates an accelerator pedal position signal that may be interpreted by the controller 54 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 54 as a demand to decrease the vehicle speed. Based upon inputs from the accelerator pedal 56 and brake pedal 58, the controller 54 commands the torque and power to the engine 14, primary electric machine 16, secondary electric machine 20, and friction brakes (not shown). The controller 54 also controls transitioning the first coupler 42 and second coupler 52 between first and second positions based on a desired power flow from the one or more power plants (i.e., engine 14, first electric machine 16, and second electric machine 20) to the drive wheel 18 to propel the HEV 10 or a desired power flow to from the powertrain 20 to battery 38 to recharge the battery 38.

There HEV 10 may operate under two regenerative braking scenarios. The first regenerative braking scenario may be referred to as light regenerative braking, while the second regenerative braking scenario may be referred to as normal or hard regenerative braking. Under the first scenario, if the operator releases pressure from the accelerator pedal 56 while the engine 14 is driving the vehicle, some of the torque and power may be transferred from the drive wheel 18 through the primary electric machine 16 (via the electromagnetic armature 24 and magnetic armature 22) and back to the engine 14, in addition to some of the power flowing to the battery 38 via one of the electric machines. The first scenario may occur for a short time period until the controller 54 determines whether or not to shut down the engine 14. Under the second scenario, the magnetic armature 22 is decoupled from the engine 14 and coupled to a mechanical ground via the first coupler 42 and the engine 14 is shut down. The controller 54 is programmed to enter into a light regenerative braking scenario if it predicted that the engine 14 will remain shut down for less than a minimum time period. This is because the energy required for restarting the engine 14 will result in more fuel consumption (even though the engine 14 shut down for short period) compared to a scenario where the engine 14 was never shut down. The controller 54 is programmed to enter into a hard regenerative braking scenario if it predicted that the engine 14 will remain shut down for greater than the minimum time period. This is because the energy required for restarting the engine 14 will not result in more fuel consumption when compared to a scenario where the engine 14 was never shut down. During an engine shutdown or restart, the primary electric machine 16 may operate as a motor to synchronize the speeds the input and output sides of the first coupler 42 that are secured to the engine 14 and the first electric machine 16, respectively, to allow for a smooth transition between modes where the engine 14 is coupled to or decoupled from the first electric machine 16.

Figure 2:
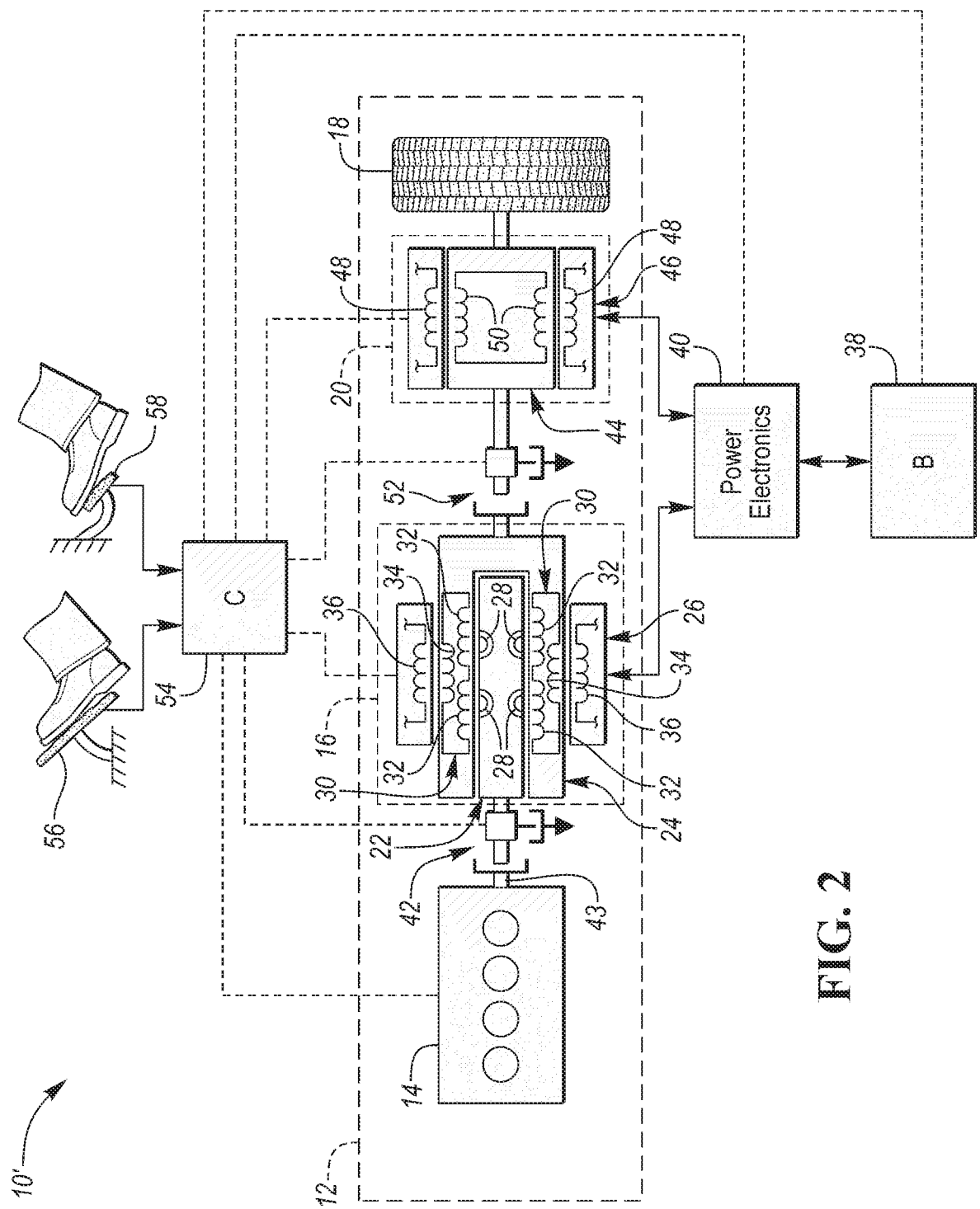
FIG. 2 is a schematic illustration of a second embodiment of the powertrain of the hybrid electric vehicle.

Referring to FIG. 2, a schematic diagram of a second embodiment of a hybrid electric vehicle (HEV) 10' is illustrated. The elements of the second embodiment of the HEV 10' depicted in FIG. 2 that are common (i.e., have the same call out numbers) with the elements of the HEV 10 depicted in FIG. 1 will have the same structure and functionally as described with respect to FIG. 1 unless otherwise stated herein. Furthermore, the second embodiment of the HEV 10' should be construed to include all of the alternative configurations of the HEV 10 depicted in FIG. 1 unless otherwise stated herein. For example, the configuration of the HEV 10' depicted in FIG. 2 may include or exclude the secondary electric machine 20 that is disposed between the electromagnetic armature 24 and the drive wheel 18 or may include or exclude either the first coupler 42 or the second coupler 52.

The difference between the HEV 10 depicted in FIG. 1 and the HEV 10' depicted in FIG. 2 are the spatial configurations of the magnetic armature 22, the electromagnetic armature 24, and the primary stator 26. The magnetic armature 22 of the first electric machine 16 depicted in FIG. 1 is a rotating drum that is disposed over the electromagnetic armature 24, which may be a rotating shaft, while the electromagnetic armature 24 of the first electric machine 16 depicted in FIG. 2 is a rotating drum that is disposed over the magnetic armature 22, which may be a rotating shaft. Furthermore, the primary stator 26 depicted in FIG. 1 is disposed over the electromagnetic armature 24 adjacent to the magnetic armature 22, while primary stator 26 in the configuration in FIG. 2 is disposed over the electromagnetic armature 24 which in turn is disposed over the magnetic armature 22.

The positioning of the primary stator 26 adjacent to the magnetic armature 22 in FIG. 1 results in a configuration of the electrical circuit 30 within the electromagnetic armature 24 where there is no overlapping of the of primary coils 32 and the secondary coils 34, and therefore no interference between the magnetic fields generated by the primary coils 32 and the magnetic fields generated by the secondary coils 34, which is desirable. The positioning of the primary stator 26 over the electromagnetic armature 24 in FIG. 2, however, results in a configuration of the electrical circuit 30 where a portion of the circuit 30 that includes the primary coils 32 overlaps a portion of the circuit 30 that includes the secondary coils 34. Therefore, to ensure there is no interference between the magnetic fields generated by the primary coils 32 and the magnetic fields generated by the secondary coils 34, the positioning of the primary coils 32 relative to the secondary coils 34 is staggered in the configuration of FIG. 2.

Figure 3:
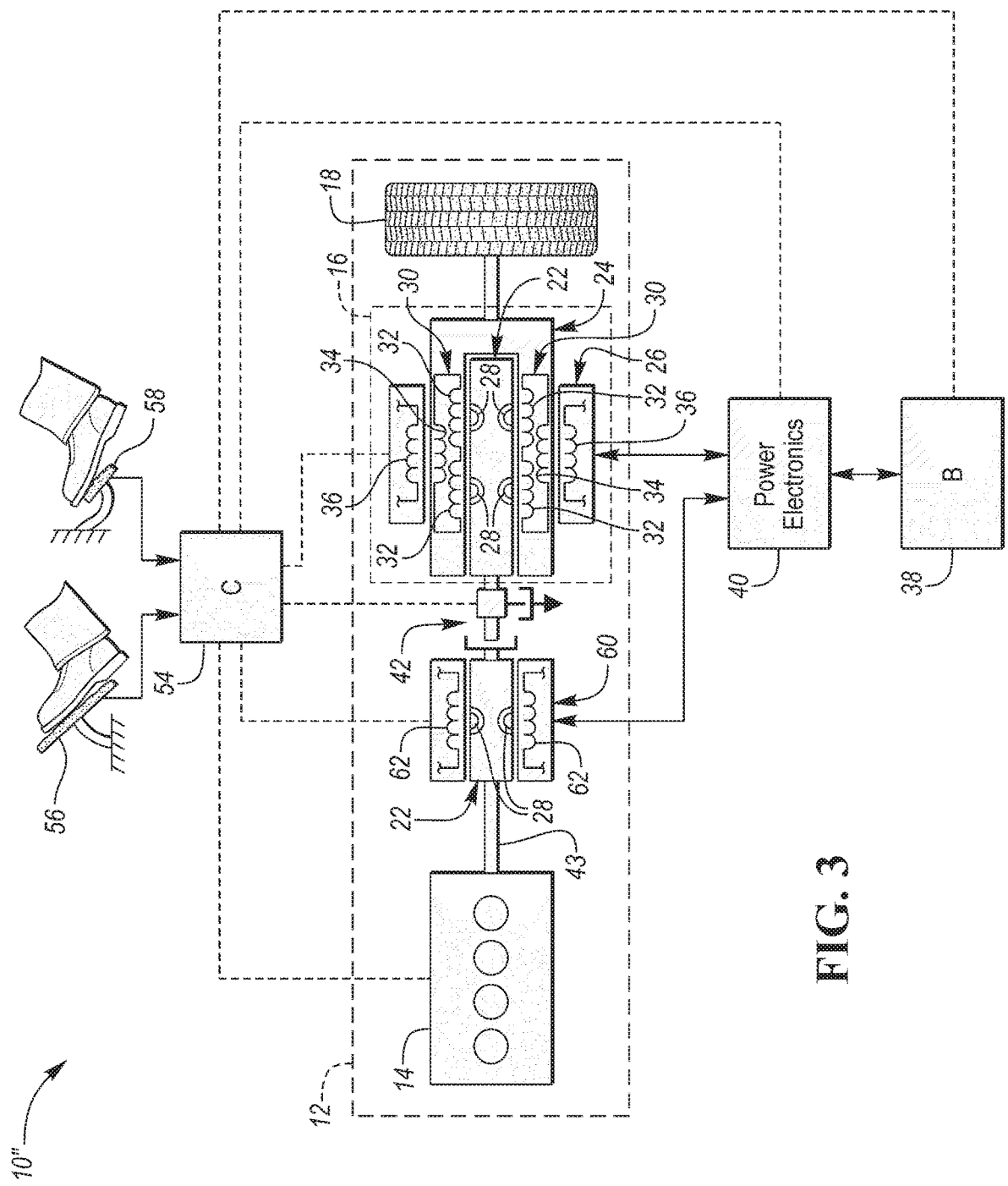
FIG. 3 is a schematic illustration of a third embodiment of the powertrain of the hybrid electric vehicle.

Referring to FIG. 3, a schematic diagram of a third embodiment of a hybrid electric vehicle (HEV) 10" is illustrated. The elements of the third embodiment of the HEV 10" depicted in FIG. 3 that are common (i.e., have the same call out numbers) with the elements of the HEV 10 depicted in FIG. 1 will have the same structure and functionally as described with respect to FIG. 1 unless otherwise stated herein. Furthermore, the third embodiment of the HEV 10" should be construed to include all of the alternative configurations of the HEV 10 depicted in FIG. 1 unless otherwise stated herein. For example, the configuration of the HEV 10" depicted in FIG. 3 may include or exclude the secondary electric machine 20 that is disposed between the electromagnetic armature 24 and the drive wheel 18 or may include or exclude either the first coupler 42 or the second coupler 52.

A first difference between the HEV 10 depicted in FIG. 1 and the HEV 10" depicted in FIG. 3 are the spatial configurations of the magnetic armature 22, the electromagnetic armature 24, and the primary stator 26. The magnetic armature 22 of the first electric machine 16 depicted in FIG. 1 is a rotating drum that is disposed over the electromagnetic armature 24, which may be a rotating shaft, while the electromagnetic armature 24 of the first electric machine 16 depicted in FIG. 3 is a rotating drum that is disposed over the magnetic armature 22, which may be a rotating shaft. Furthermore, the primary stator 26 depicted in FIG. 1 is disposed over the electromagnetic armature 24 adjacent to the magnetic armature 22, while primary stator 26 in the configuration in FIG. 3 is disposed over the electromagnetic armature 24 which in turn is disposed over the magnetic armature 22.

The positioning of the primary stator 26 adjacent to the magnetic armature 22 in FIG. 1 results in a configuration of the electrical circuit 30 within the electromagnetic armature 24 where there is no overlapping of the of primary coils 32 and the secondary coils 34, and therefore no interference between the magnetic fields generated by the primary coils 32 and the magnetic fields generated by the secondary coils 34, which is desirable. The positioning of the primary stator 26 over the electromagnetic armature 24 in FIG. 3, however, results in a configuration of the electrical circuit 30 where a portion of the circuit 30 that includes the primary coils 32 overlaps a portion of the circuit 30 that includes the secondary coils 34. Therefore, to ensure there is no interference between the magnetic fields generated by the primary coils 32 and the magnetic fields generated by the secondary coils 34, the positioning of the primary coils 32 relative to the secondary coils 34 is staggered in the configuration of FIG. 3.

A second difference between the between the HEV 10 depicted in FIG. 1 and the HEV 10" depicted in FIG. 3 is that the HEV 10" depicted in FIG. 3 includes a tertiary stator 60 that is disposed about the magnetic armature 22. The tertiary stator 60 includes senary coils 62 that are configured to add torque and power to the magnetic armature 22 in addition to the engine 14. More specifically, power may flow from a battery 38 to the senary coils 62 in order to drive or rotate the magnetic armature 22. The power electronics 40 are disposed between the battery 38 and the senary coils 62 in order to convert the direct current from the battery 30 into alternating current which is then delivered to the senary coils 62. If power is flowing from the magnetic armature 22 and back to the battery 38 through the tertiary stator 60 (which may occur during regenerative braking or if the engine 14 is operating the primary electric machine 16 as a generator) then the power electronics 40 operate to convert the alternating current generated in the senary coils 62 into direct current which is then delivered to the battery 38.

A third difference between the HEV 10 depicted in FIG. 1 and the HEV 10'' depicted in FIG. 3 may be the positioning of the first coupler 42. The first coupler 42 may be positioned between the magnetic armature 22 and the engine 14 as described above with reference to FIG. 1. Alternatively, the first coupler 42 may be positioned between two subsections of the magnetic armature 22. The first subsection of the magnetic armature 22 may include the magnets that are configured to interact with the primary coils 32 of the electromagnetic armature 24 and the second subsection of the magnetic armature may include the magnets that are configured to interact with the senary coils 62 of the tertiary stator 60.

If with the engine 14 is running, the drive wheel 18 is turning, and no electrical power is drawn or added to or from the senary coils 62 while drawing electrical power from the secondary coils 34, the drive wheel 18 will turn at a speed that is one half of the speed of crankshaft 43 or less, half of the engine power will be utilized to drive the drive wheel 18, and half of the engine power will be utilized to charge the battery 38. The same will be true for the configuration in FIGS. 1 and 2, when the engine 14, electromagnetic armature 24, and drive wheel 18 are all connected. There is no way to add load to the engine 14 without increasing the speed of the drive wheel 18 when no electrical power is drawn or added to or from the senary coils 62. Therefore, controlling the load (i.e., power) on the engine 14 results in adjusting the speed of the drive wheel 18. Since controlling load on the engine 14 results in adjusting the speed of the drive wheel 18, the powertrain configurations disclosed herein may be referred to as speed split hybrids, where the power may be split between the drive wheel 18 and the battery 38 primarily by controlling the speed of the engine 14 and/or the speed of the drive wheel 18.

If electrical power is drawn from the senary coils 62 (e.g., to charge the battery 38), the power delivered to the senary coils 62 will have been supplied by the engine 14. The power from the engine 14 that is being delivered to the senary coils 62 will not be available to the primary electric machine 16 to either be delivered as power and torque to the drive wheel 18 or to be delivered as electrical power to charge the battery 38 through the tertiary coils 36. Therefore, a load may be added to the engine 14 from the senary coils 62 without increasing the speed of the drive wheel 18. Engine power may be controlled based on the torque demanded by the senary coils 62 and may be split based on torque between the senary coils 62 and the primary electric machine 16 (which either delivers the power to the drive wheel 18 or the battery 38), even though engine power may be controlled to obtain a desired speed of the drive wheel 18 as described in the paragraph above. Therefore, the powertrain configurations disclosed herein may be controlled by splitting both the torque and the speed that is delivered from the engine 14 to the primary electric machine 16 (which either delivers the power to the drive wheel 18 or the battery 38).

It should be understood that each of the sets of coils described above (i.e., primary coils 32, secondary coils 34, tertiary coils 36, quaternary coils 48, quinary coils 50, and senary coils 62) may be representative of multiple phases of coil windings where each phase may include one or more coil windings. Additionally, it should be understood that although maybe not shown, electrical connections are established between the battery 38, power electronics 40, and the various stator coils (e.g., tertiary coils 36, quaternary coils 48, and senary coils 62) It should also be understood that the designations of first, second, third, fourth, etc. or primary, secondary, tertiary, quaternary, etc. for coils, rotors, armatures, stators, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    an electromagnetic armature having an electrical circuit that includes primary and secondary coils;
    an engine having a crankshaft configured to rotate a magnetic armature to induce current in the circuit via the primary coils;
    a stator having tertiary coils configured to transfer power to the secondary coils to rotate the electromagnetic armature, and wherein the electromagnetic armature is configured to transfer power to the tertiary coils via the secondary coils to charge a battery; and
    a secondary electric machine that is configured to drive a wheel and charge the battery.

2. The vehicle of claim 1, wherein a rotor of the secondary electric machine is disposed between the electromagnetic armature and the wheel and is coupled to each of the electromagnetic armature and the wheel.

3. The vehicle of claim 2 further comprising a coupler that is configured to couple and decouple the rotor of the secondary electric machine to and from the electromagnetic armature.

4. The vehicle of claim 1 further comprising a coupler that is configured to couple and decouple the crankshaft from the magnetic armature.

5. The vehicle of claim 1 further comprising a second stator having quaternary coils configured to generate torque within the magnetic armature.

6. A vehicle comprising:
    an electromagnetic armature having an electrical circuit that includes primary and secondary coils;
    an engine having a crankshaft configured to rotate a magnetic armature to induce current in the circuit via the primary coils;
    a stator having tertiary coils configured to transfer power to the secondary coils to rotate the electromagnetic armature; and
    a coupler that is configured to couple and decouple the crankshaft from the magnetic armature.

7. The vehicle of claim 6, wherein the electromagnetic armature is configured to transfer power to the tertiary coils via the secondary coils to charge a battery.

8. The vehicle of claim 7 further comprising a secondary electric machine that is configured to drive a wheel and charge the battery.

9. The vehicle of claim 8, wherein a rotor of the secondary electric machine is disposed between the electromagnetic armature and the wheel and is coupled to each of the electromagnetic armature and the wheel.

10. The vehicle of claim 9 further comprising a second coupler that is configured to couple and decouple the rotor of the secondary electric machine to and from the electromagnetic armature.

11. The vehicle of claim 6 further comprising a second stator having quaternary coils configured to generate torque within the magnetic armature.

12. A vehicle comprising:
   an electromagnetic armature having an electrical circuit that includes primary and secondary coils;
   an engine having a crankshaft configured to rotate a magnetic armature to induce current in the circuit via the primary coils;
   a stator having tertiary coils configured to transfer power to the secondary coils to rotate the electromagnetic armature; and
   a second stator having quaternary coils configured to generate torque within the magnetic armature.

13. The vehicle of claim 12, wherein the electromagnetic armature is configured to transfer power to the tertiary coils via the secondary coils to charge a battery.

14. The vehicle of claim 13 further comprising a secondary electric machine that is configured to drive a wheel and charge the battery.

15. The vehicle of claim 14, wherein a rotor of the secondary electric machine is disposed between the electromagnetic armature and the wheel and is coupled to each of the electromagnetic armature and the wheel.

16. The vehicle of claim 15 further comprising a coupler that is configured to couple and decouple the rotor of the secondary electric machine to and from the electromagnetic armature.

17. The vehicle of claim 12 further comprising a coupler that is configured to couple and decouple the crankshaft from the magnetic armature.

* * * * *